United States Patent
Wolfrum et al.

[11] B 3,925,350
[45] Dec. 9, 1975

[54] PHENYL-AZO-INDOLE COMPOUNDS

[75] Inventors: Gerhard Wolfrum, Bergisch-Neukirchen; Richard Sommer, Leverkusen; Erich Klauke, Odenthal-Hahnenberg, all of Germany

[73] Assignee: Bayer Aktiengesellschaft, Leverkusen-Bayerwerk, Germany

[22] Filed: Jan. 26, 1973

[21] Appl. No.: 327,109

[44] Published under the Trial Voluntary Protest Program on January 28, 1975 as document no. B 327,109.

[30] Foreign Application Priority Data
Jan. 26, 1972 Germany............... 2203460.2

[52] U.S. Cl............ 260/165; 8/41 B; 260/247.1 R; 260/293.73; 260/319.1; 260/326.12 R; 260/326.13 R; 260/326.16; 260/332.1; 260/465 E; 260/508; 260/509; 260/518; 260/556 B; 260/397.7; 260/578

[51] Int. Cl.² ....................................... C09B 29/36

[58] Field of Search.......................... 260/165, 152

[56] References Cited
UNITED STATES PATENTS
| | | | |
|---|---|---|---|
| 1,835,393 | 12/1931 | Hentrich et al.............. | 260/165 |
| 3,255,173 | 6/1966 | Dehnert et al.............. | 260/165 X |
| 3,657,217 | 4/1972 | Hiller et al................. | 260/165 |

*Primary Examiner*—Lorraine A. Weinberger
*Assistant Examiner*—C. F. Warren
*Attorney, Agent, or Firm*—Plumley & Tyner

[57] ABSTRACT

Monoazo dyestuffs which in the form of the free acid correspond to the formula

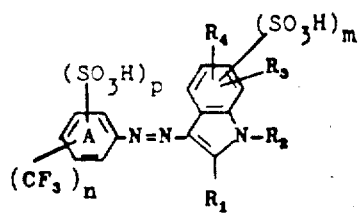

wherein $R_1$ is alkyl or aryl; $R_2$ is hydrogen or alkyl; $R_3$ is hydrogen, halogen or alkyl; $R_4$ is hydrogen, halogen, alkyl, alkoxy, or nitrile; $p$ or $m$ are 0 or 1 with the sum of the two being 1 or 2; and $n$ is 1 or 2; and A may contain further substituents free of sulfo or sulfato, and their use for the dyeing of natural and synthetic fibre materials, especially for dyeing polyamide fibres. They give level dyeings of good yield with very good fastness to light. They are even absorbed well on polyamide fibres from a neutral to weak acid dye bath. By polyamide fibres there are here especially understood those of synthetic polyamides such as ε-polycaprolactam or condensation products of adipic acid and hexamethylenediamine.

1 Claim, No Drawings

PHENYL-AZO-INDOLE COMPOUNDS

The subject of the present invention are monoazo dyestuffs which in the form of the free acid correspond to the formula

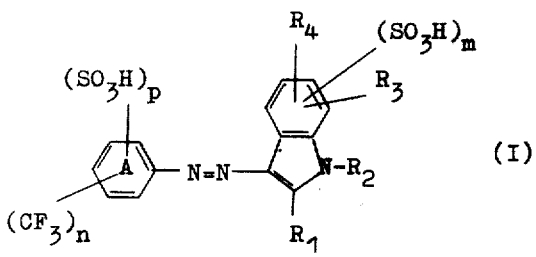

wherein
$R_1$ = alkyl or aryl,
$R_2$ = hydrogen or alkyl,
$R_3$ = hydrogen, halogen or alkyl,
$R_4$ = hydrogen, halogen, alkyl, alkoxy or nitrile,
$p, m$ = 0 or 1, with $p + m$ = 1 or 2 and
$n$ = 1 or 2, and
the benzene ring A can contain further substituents free of $SO_3H$ and $-OSO_3H$ groups,
and their manufacture and use for dyeing natural and synthetic fibre materials.

Suitable alkyl groups $R_1$, $R_3$ and $R_4$ are those with 1 - 8 C atoms, especially unsubstituted $C_1-C_4$-alkyl radicals such as, for example, $-CH_3$, $-C_2H_5$, $-i-C_3H_7$ and $-n-C_4H_9$.

Suitable alkyl groups $R_2$ are those with 1 - 8 C atoms, especially $C_1-C_4$—alkyl radicals which can be further substituted by $-CN$, $-CONH_2$ or $-COOH$, such as, for example, $-CH_3$, $-C_2H_5$, $-C_3H_7$, $-C_4H_9$, $-CH_2CH_2CN$, $-CH_2CH_2CONH_2$ and $-CH_2-CH_2COOH$.

Suitable aryl radicals $R_1$ are, in particular, phenyl or naphthyl radicals which are optionally substituted further, for example phenyl, naphthyl, p-biphenyl, 4-chlorophenyl, 2,4-dichlorophenyl or 4-methylphenyl.

Suitanle halogen atoms are chlorine, bromine and fluorine.

Suitable alkoxy groups are especially those with 1 - 4 C atoms such as, for example, $OOCH_3$, $-OC_2H_5$, $-OC_3H_7$ and $-OC_4H_9$.

The radical of the diazo component A can contain, in addition to the sulphonic acid group which is optionally present in accordance with the definition, further substituents which are free of sulphonic acid groups, for example $-COOH$, halogen, such as chlorine, bromine or fluorine, $-NO_2$, alkoxy groups with 1 - 4 C atoms, such as $-OCH_3$, $-OC_2H_5$, $-OC_3H_7$ and $-OC_4H_9$, $-CN$, alkyl groups with 1 - 4 C atoms, such as $-CH_3$, $-C_2H_5$, $-C_3H_7$ and $-C_4H_9$, and optionally substituted sulphonamide such as $-SO_2NH_2$, N-alkyl-, N,N-dialkyl-, N-aryl-, N-aryl-N-alkyl-, N-cycloalkyl-, N-alkyl-N-cycloalkyl-, N,N-dicycloalkyl-, N-aralkyl-, N-aralkyl-N-alkyl-, N-sulpholanyl-(3)-sulphonamide and

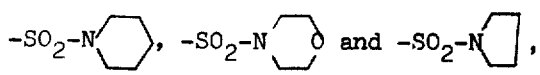

with the alkyl substituents in the sulphonamide radical preferably possessing 1 - 4 C atoms and being allowed to contain further substituents such as, for example, hydroxyl, chlorine, bromine, nitrile, alkoxy or alkoxycarbonyl. Suitable arylsulphonamides are, for example N-phenylsulphonamides and N-naphthylsulphonamides; amongst N-aralkylsulphonamides there are in particular to be understood N-benzylsulphonamides and N-phenethylsulphonamides and by N-cycloalkylsulphonamides there are in particular to be understood N-cyclohexylsulphonamides and N-cyclopentylsulphonamides. The aryl, aralkyl and cycloalkyl radicals can also possess further non-ionic substituents such as, for example, $C_1-C_4$-alkyl groups or halogen, such as chlorine or bromine.

Preferred dyestuffs within the framework of the formula (I) are those which in the form of the free acid correspond to the formula

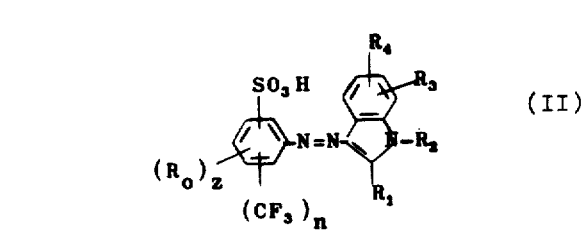

wherein
$R_1$, $R_2$, $R_3$, $R_4$ and $n$ have the abovementioned meaning,
$R_o$ represents halogen or alkyl and
$z$ represents 0, 1 or 2.

Particularly preferred dyestuffs are those of the formula

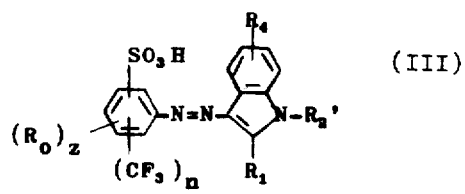

wherein
$R_o$, $R_1$, $R_4$, $n$ and $z$ have the abovementioned meaning and
$R_2'$ represents hydrogen or $C_1-C_4$ alkyl which is optionally substituted by $-CN$, $-CONH_2$ or $-COOH$, especially those of the formula

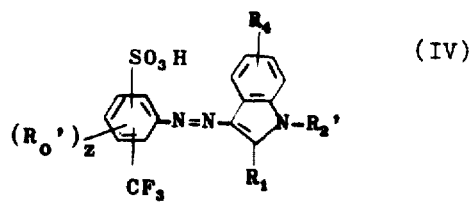

wherein
$R_1$, $R_2'$, $R_4$ and $z$ have the abovementioned meaning and
$R_o'$ represents chlorine or bromine.

Particularly preferred dyestuffs within the framework of the formula (III) are those of the formula

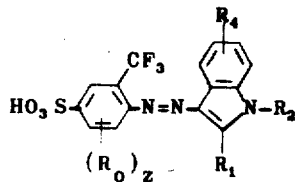

wherein $R_0$, $R_1$, $R_2$, $R_4$ and $z$ have the abovementioned meaning.

The radicals $R_o$ or $R_o'$ can here be identical or different.

Further preferred dyestuffs of the general formula (I) are those in the form of the free acid correspond to the formula

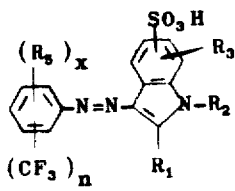

(V)

wherein $R_1$, $R_2$, $R_3$ and $n$ have the aforementioned meaning, $R_5$ represents a non-ionic substituent and $x$ represents the numbers 0, 1 or 2.

Particularly preferred dyestuffs are those of the formula

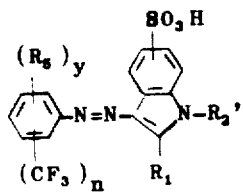

(VI)

wherein $R_1$, $R_2'$, $R_5$ and $n$ have the aforementioned meaning and $y$ represents the numbers 1 or 2, especially those of the formula

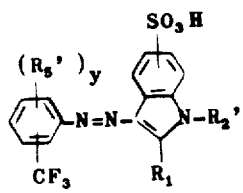

(VII)

wherein $R_1$, $R_2'$ and $y$ have the aforementioned meaning and $R_5'$ represents chlorine, bromine or an optionally substituted sulphonamide group.

The substituents $R_5$ and $R_5'$ can here be identical or different.

The new dyestuffs of the formula (I) are obtained by diazotising amines of the general formula

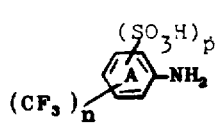

(VIII)

wherein

A, $n$ and $p$ have the meaning mentioned in the formula (I) and combining them with a coupling component of the formula

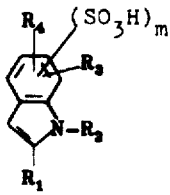

(IX)

wherein $R_1$–$R_4$ and $m$ have the meaning mentioned in the formula (I).

Examples of suitable amines of the formula (VIII) are: o-, m- and p-trifluoromethyl-aniline, 2-methyl-4-trifluoromethylaniline, 3-methyl-4-trifluoromethyl-aniline, 4-methyl-2-trifluoromethyl-aniline, 2-trifluoromethyl-4-chloro-aniline, 2-trifluoromethyl-4-bromo-aniline, 3-trifluoromethyl-4-fluoro-aniline, 2,6-dichloro-4-trifluoromethyl-aniline, 2-trifluoromethyl-4-nitro-aniline, 3-trifluoromethyl-4-methoxy-aniline, 4-trifluoromethyl-5-chloro-aniline, 2,3,5,6-tetrachloro-4-trifluoromethylaniline, 2-trifluoromethyl-5-nitro-aniline, 3-trifluoromethyl-6-bromo-aniline, 2,6-dinitro-4-trifluoromethyl-aniline, 2-cyano-4-trifluoromethyl-aniline, 2-nitro-4-trifluoromethyl-aniline, 2-cyano-6-nitro-4-trifluoromethyl-aniline, 2-trifluoromethyl-6-chloro-aniline, 3-trifluoromethyl-4-bromo-aniline, 2,5-dichloro-4-trifluoromethyl-aniline, 2-trifluoromethyl-5-chloro-aniline, 3-trifluoromethyl-6-chloro-aniline, 2-chloro-3-trifluoromethylaniline, 3-chloro-2-trifluoromethyl-aniline, 2-trifluoromethyl-4-fluoro-aniline, 2,4-bis-(trifluoromethyl)-aniline, 2,5-bis-(trifluoromethyl)-aniline, 2,6-bis-(trifluoromethyl)-aniline, 2-nitro-4,6-bis-(trifluoromethyl)-aniline, 4-nitro-2,6-bis-(trifluoromethyl)-aniline, 2-chloro-5-trifluoromethyl-aniline-4-sulphonic acid, 4-trifluoromethyl-aniline-2-sulphonic acid, 2,4-dichloro-5-trifluoromethyl-aniline-6-sulphonic acid, 2,5-dichloro-3-trifluoromethyl-aniline-4-sulphonic acid, 3-trifluoromethyl-aniline-4-sulphonic acid, 2-bromo-5-trifluoromethylaniline-4-sulphonic acid, 2-trifluoromethyl-4-chloro-aniline-6-sulphonic acid, 2-methoxy-5-trifluoromethyl-aniline-4-sulphonic acid, 2-trifluoromethyl-aniline-4-sulphonic acid, 2-methyl-5-trifluoromethyl-aniline-4-sulphonic acid, and the sulphonamides, N-alkyl-, N,N-dialkyl-, N-aryl-, N-alkyl-N-aryl-, N-cycloalkyl-, N,N-dicycloalkyl-, N-aralkyl-N-alkyl-, N,N-diaralkyl-, N-pentamethylene-, and N-sulpholanyl-(3)-sulphonamides which are derived from the abovementioned sulphonic acids.

These sulphonamides are obtained in accordance with methods known from the literature, for example by reacting the appropriately substituted N-acylated aniline-sulphochlorides with amines and subsequently splitting off the acyl group or reacting the appropriately substituted nitrobenzene-sulphochlorides with amines and subsequently reducing the nitro group to the amino group.

Examples of suitable coupling components are: 2-methylindole, 2-phenyl-indole, 1-methyl-2-phenyl-indole, 1,2-dimethyl-indole, 1-β-cyanoethyl-2-methyl-indole, 1-β-cyanoethyl-2-phenyl-indole, β-(2-phenyl-indolyl-1)-propionic acid amide, β-(2-methyl-indolyl- 1)-propionic acid amide, 1-(γ-aminopropyl-2-phenyl-indole, β-(2-methyl-indolyl-1)-propionic acid, 2-β-naphthyl-indole, 2-p-diphenylyl-indole, 2,5-dimethyl-indole, 2,4-dimethyl-7-methoxy-indole, 2-phenyl-5-ethoxy-indole, 2-methyl-5-ethoxy-indole, 2-methyl-5-chloroindole, 2-methyl-6-chloro-indole, 2-methyl-5-nitro-indole, 2-methyl-5-cyano-indole, 2-methyl-7-chloro-indole, 2-methyl-5-fluoro-indole, 2-methyl-5-bromo-indole, 2-methyl-5,7-dichloro-indole and 1-β-cyanoethyl-2,6-dimethyl-indole and also the indole-sulphonic acid described in German Patent Specification No. 137,117 and other indole-sulphonic acids manufactured analogously to the process described in German Patent Specification No. 137,117 from 2-alkyl-indoles or 2-aryl-indoles, for example 2-methyl-indole-sulphonic acid, 1,2-dimethyl-indole-sulphonic acid, 2,5-dimethyl-indole-sulphonic acid, 1-ethyl-2-methyl-indole-sulphonic acid, 1,2,5-trimethyl-indole-sulphonic acid, 1-ethyl-2,5-dimethyl-indole-sulphonic acid, 2-phenyl-indole-sulphonic acid, 1-methyl-2-phenyl-indole-sulphonic acid and β-[(2-phenyl-5-sulphoindolyl-(1)]-propionic acid amide. It is probable that at least in the case of the indoles which are unsubstituted in the carbocyclic part the sulpho group enters in the 5-position during the sulphonation in accordance with the processes described in German Patent Specification No. 137,117.

The dyestuffs according to the invention are suitable for dyeing natural and synthetic fibre materials, especially for dyeing polyamide fibres. They give level yellow to orange dyeings of good yield and very good fastness to light. They are even absorbed well on polyamide fibres from a neutral to weak acid dye bath. By polyamide fibres there are here especially understood those of synthetic polyamides such as ε-polycaprolactam or condensation products of adipic acid and hexamethylenediamine. The dyestuffs are here employed in the form of the free acid or in the form of their salts, especially of the alkali metal salts such as the sodium or potassium salts, or the ammonium salts. The formulae given above are those of the free acids.

EXAMPLE 1

4.25 g of 2-trifluoromethyl-4-chloro-aniline are diazotised in dilute hydrochloric acid, at 0°C, with 16 g of a 10 percent strength sodium nitrite solution. After the excess nitrite has been removed with amidosulphonic acid, the solution of the diazonium salt is combined with a solution of 4.75 g of 2-methylindole-sulphonic acid in water and the mixture is buffered slightly with sodium acetate. After completion of coupling the dyestuff, which in the form of the free acid corresponds to the formula

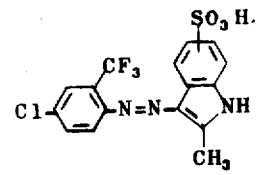

is isolated. The dyestuff dyes polyamide from a weakly acid or neutral bath in greenish-tinged yellow shades of very good fastness to light.

EXAMPLE 2

3.5 g of 2-trifluoromethyl-aniline-4-sulphonic acid are diazotised in dilute hydrochloric acid with 10 g of a 10 percent strength sodium nitrite solution. The solution of the diazonium compound is combined with a solution of 2.0 g of 2-methyl-indole in glacial acetic acid. The mixture is buffered slightly with sodium acetate and the dyestuff, which in the form of the free acid corresponds to the formula

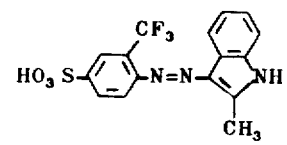

is isolated by filtration. The dyestuff dyes polyamide, from a weakly acid or neutral bath, in greenish-tinged yellow shades of very good fastness to light.

DYEING EXAMPLE 0.1 g of the dyestuff from Example 1 is dissolved in 100 ml of hot water, 5 ml of 10 percent strength ammonium acetate solution are added and the mixture is diluted to a volume of 500 ml with water. 10 g of polyamide fibre are introduced into the dye bath, which is brought to the boil over the course of 20 minutes, 4 ml of 10 percent strength acetic acid are added and the bath is kept at the boil for one hour. Thereafter the material is rinsed and dried at 70°-80°C. A dyeing in a greenish-tinged yellow shade of very good fastness to light and to wet processing is obtained.

If the procedure in Example 1 or in Example 2 is followed the diazo components employed are the compounds listed in Column I of the table which follows and the coupling components employed are the compounds listed in Column II of the table which follows, valuable water-soluble dyestuffs, which dye polyamide from a weakly acid or neutral bath in yellow to orange light-fast shades, are again obtained.

| Example | Diazo component | Coupling component |
|---------|-----------------|--------------------|
| 3 | Cl–⟨⟩–NH₂ / CF₃ | 2-phenyl-indole-sulphonic acid |
| 4 | " | 1,2-dimethyl-indole-sulphonic acid |
| 5 | " | 1-methyl-2-phenyl-indole-sulphonic acid |
| 6 | " | 1,2,5-trimethyl-indole-sulphonic acid |

-Continued

| Example | Diazo component | Coupling component |
|---|---|---|
| 7 | 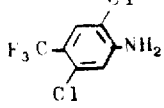 2,5-dichloro-4-trifluoromethyl aniline | 2-methyl-indole-sulphonic acid |
| 8 | " | 2-phenyl-indole-sulphonic acid |
| 9 | " | 1-ethyl-2-methyl-indole-sulphonic acid |
| 10 | 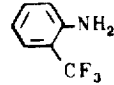 2-trifluoromethyl aniline | 2-methyl-indole-sulphonic acid |
| 11 | " | 2-ethyl-indole-sulphonic acid |
| 12 |  4-trifluoromethyl aniline | 2-phenyl-indole-sulphonic acid |
| 13 | " | 2-methyl-indole-sulphonic acid |
| 14 | " | 1,2-dimethyl-indole-sulphonic acid |
| 15 | 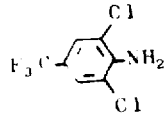 | 2-methyl-indole-sulphonic acid |
| 16 | " | 2-phenyl-indole-sulphonic acid |
| 17 | 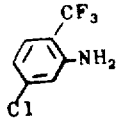 | 2-phenyl-indole-sulphonic acid |
| 18 | 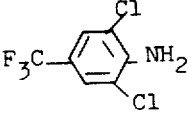 | 1,2-dimethyl-indole-sulphonic acid |
| 19 | " | 1-methyl-2-phenyl-indole-sulphonic acid |
| 20 | 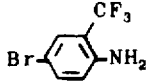 | 2-methyl-indole-sulphonic acid |
| 21 | " | 1,2,5-trimethyl-indole-sulphonic acid |
| 22 | 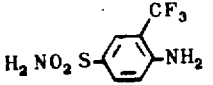 | 2-methyl-indole-sulphonic acid |
| 23 | " | 2-phenyl-indole-sulphonic acid |
| 24 | " | 1-methyl-2-phenyl-indole-sulphonic acid |
| 25 | 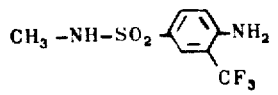 | 2-methyl-indole-sulphonic acid |

| Example | Diazo component | Coupling component |
|---|---|---|
| 26 |  (C₂H₅)₂N-SO₂-C₆H₃(CF₃)-NH₂ | 1,2-dimethyl-indole-sulphonic acid |
| 27 | 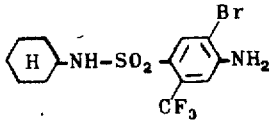 C₆H₁₁-NH-SO₂-C₆H₂(Br)(CF₃)-NH₂ | 2-methyl-indole-sulphonic acid |
| 28 | 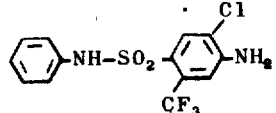 C₆H₅-NH-SO₂-C₆H₂(Cl)(CF₃)-NH₂ | 2-phenyl-indole-sulphonic acid |
| 29 |  (CH₃)₂N-SO₂-C₆H₂(Cl)(CF₃)-NH₂ | 1-ethyl-2-methyl-indole-sulphonic acid |
| 30 | 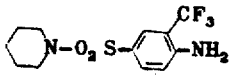 piperidino-O₂S-C₆H₃(CF₃)-NH₂ | 2-methyl-indole-sulphonic acid |
| 31 | " | 2-phenyl-indole-sulphonic acid |
| 32 | " | 1-methyl-2-phenyl-indole-sulphonic acid |
| 33 | 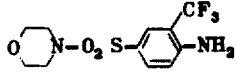 morpholino-O₂S-C₆H₃(CF₃)-NH₂ | 2-methyl-indole-sulphonic acid |
| 34 | " | 2-phenyl-indole-sulphonic acid |
| 35 | " | 1-methyl-2-phenyl-indole-sulphonic acid |
| 36 | 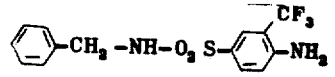 C₆H₅-CH₂-NH-O₂S-C₆H₃(CF₃)-NH₂ | 2-methyl-indole-sulphonic acid |
| 37 | " | 2-phenyl-indole-sulphonic acid |
| 38 | " | 1-methyl-2-phenyl-indole-sulphonic acid |
| 39 | 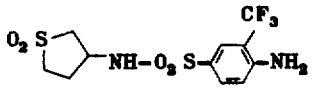 O₂S(CH₂)₄-NH-O₂S-C₆H₃(CF₃)-NH₂ | 2-methyl-indole-sulphonic acid |
| 40 | " | 2-phenyl-indole-sulphonic acid |
| 41 | " | 1-methyl-2-phenyl-indole-sulphonic acid |
| 42 | 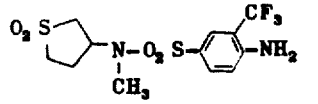 O₂S(CH₂)₄-N(CH₃)-O₂S-C₆H₃(CF₃)-NH₂ | 2-methyl-indole-sulphonic acid |
| 43 | " | 2-phenyl-indole-sulphonic acid |
| 44 | " | 1-methyl-2-phenyl-indole-sulphonic acid |

-Continued

| Example | Diazo component | Coupling component |
|---|---|---|
| 45 | F₃C—⌬(CN)—NH₂ | 2-methyl-indole-sulphonic acid |
| 46 | " | 2-phenyl-indole-sulphonic acid |
| 47 | " | 1-methyl-2-phenyl-indole-sulphonic acid |
| 48 | " | 1,2,5-trimethyl-indole-sulphonic acid |
| 49 | " | 1-ethyl-2-methyl-indole-sulphonic acid |
| 50 | " | 1-ethyl-2,5-dimethyl-indole-sulphonic acid |
| 51 | " | 1,2-dimethyl-indole-sulphonic acid |
| 52 | F₃C—⌬(CF₃)—NH₂ | 2-methyl-indole-sulphonic acid |
| 53 | " | 2-phenyl-indole-sulphonic acid |
| 54 | " | 1-methyl-2-phenyl-indole-sulphonic acid |
| 55 | " | 1,2-dimethyl-indole-sulphonic acid |
| 56 | " | 1,2,5-trimethyl-indole-sulphonic acid |
| 57 | " | 1-ethyl-2-methyl-indole-sulphonic acid |
| 58 | " | 2-methyl-5-chloro-indole-sulphonic acid |
| 59 | F₃C—⌬(NH₂)(SO₂NH₂) | 2-methyl-indole-sulphonic acid |
| 60 | " | 2-phenyl-indole-sulphonic acid |
| 61 | " | 1-methyl-2-phenyl-indole-sulphonic acid |
| 62 | F₃C—⌬(NH₂)(SO₂N(C₂H₅)₂) | 2-methyl-indole-sulphonic acid |
| 63 | " | 2-phenyl-indole-sulphonic acid |
| 64 | " | 1-methyl-2-phenyl-indole-sulphonic acid |
| 65 | F₃C—⌬(NH₂)(SO₂NH—⌬) | 2-methyl-indole-sulphonic acid |
| 66 | " | 2-phenyl-indole-sulphonic acid |

-Continued

| Example | Diazo component | Coupling component |
|---|---|---|
| 67 | " | 1-methyl-2-phenyl-indole-sulphonic acid |
| 68 | F₃C-C₆H₃(NH₂)(SO₂NH-C₆H₄-Cl) | 2-methyl-indole-sulphonic acid |
| 69 | " | 2-phenyl-indole-sulphonic acid |
| 70 | " | 1-methyl-2-phenyl-indole-sulphonic acid |
| 71 | F₃C-C₆H₃(NH₂)(SO₂N(C₆H₅)(C₂H₅)) | 2-methyl-indole-sulphonic acid |
| 72 | " | 2-phenyl-indole-sulphonic acid |
| 73 | " | 1-methyl-2-phenyl-indole-sulphonic acid |
| 74 | F₃C-C₆H₃(NH₂)(SO₂NH-C₆H₁₁) | 2-methyl-indole-sulphonic acid |
| 75 | " | 2-phenyl-indole-sulphonic acid |
| 76 | " | 1-methyl-2-phenyl-indole-sulphonic acid |
| 77 | F₃C-C₆H₃(NH₂)(SO₂-N-piperidyl) | 2-methyl-indole-sulphonic acid |
| 78 | " | 2-phenyl-indole-sulphonic acid |
| 79 | " | 1-methyl-2-phenyl-indole-sulphonic acid |
| 80 | F₃C-C₆H₃(NH₂)(SO₂-N-morpholinyl) | 2-methyl-indole-sulphonic acid |
| 81 | " | 2-phenyl-indole-sulphonic acid |
| 82 | " | 1-methyl-2-phenyl-indole-sulphonic acid |
| 83 | H₂N-O₂S-C₆H₃(NH₂)(CF₃) | 2-methyl-indole-sulphonic acid |
| 84 | " | 2-phenyl-indole-sulphonic acid |
| 85 | " | 1-methyl-2-phenyl-indole-sulphonic acid |
| 86 | (C₄H₉)₂N-O₂S-C₆H₃(NH₂)(CF₃) | 2-methyl-indole-sulphonic acid |

-Continued

| Example | Diazo component | Coupling component |
|---|---|---|
| 87 | " | 2-phenyl-indole-sulphonic acid |
| 88 | " | 1-methyl-2-phenyl-indole-sulphonic acid |
| 89 | 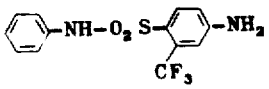 | 2-methyl-indole-sulphonic acid |
| 90 | " | 2-phenyl-indole-sulphonic acid |
| 91 | " | 1-methyl-2-phenyl-indole-sulphonic acid |
| 92 | 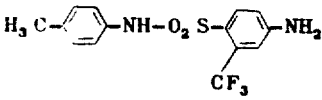 | 2-methyl-indole-sulphonic acid |
| 93 | " | 2-phenyl-indole-sulphonic acid |
| 94 | " | 1-methyl-2-phenyl-indole-sulphonic acid |
| 95 | 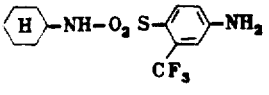 | 2-methyl-indole-sulphonic acid |
| 96 | " | 2-phenyl-indole-sulphonic acid |
| 97 | " | 1-methyl-2-phenyl-indole-sulphonic acid |
| 98 | 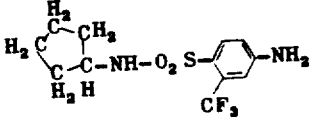 | 2-methyl-indole-sulphonic acid |
| 99 | " | 2-phenyl-indole-sulphonic acid |
| 100 | " | 1-methyl-2-phenyl-indole-sulphonic acid |
| 101 | 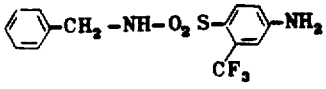 | 2-methyl-indole-sulphonic acid |
| 102 | " | 2-phenyl-indole-sulphonic acid |
| 103 | " | 1-methyl-2-phenyl-indole-sulphonic acid |
| 104 | 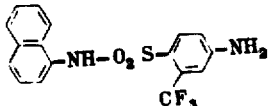 | 2-methyl-indole-sulphonic acid |
| 105 | " | 2-phenyl-indole-sulphonic acid |
| 106 | " | 1-methyl-2-phenyl-indole-sulphonic acid |
| 107 | 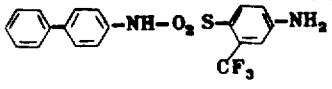 | 2-methyl-indole-sulphonic acid |

–Continued

| Example | Diazo component | Coupling component |
|---|---|---|
| 108 | " | 2-phenyl-indole-sulphonic acid |
| 109 | " | 1-methyl-2-phenyl-indole-sulphonic acid |
| 110 | HO-CH$_2$CH$_2$NH-O$_2$S-C$_6$H$_3$(CF$_3$)-NH$_2$ | 2-methyl-indole-sulphonic acid |
| 111 | " | 2-phenyl-indole-sulphonic acid |
| 112 | " | 1-methyl-2-phenyl-indole-sulphonic acid |
| 113 | HO-CH$_2$CH$_2$-N(C$_2$H$_5$)-O$_2$S-C$_6$H$_3$(CF$_3$)-NH$_2$ | 2-methyl-indole-sulphonic acid |
| 114 | " | 2-phenyl-indole-sulphonic acid |
| 115 | " | 1-methyl-2-phenyl-indole-sulphonic acid |
| 116 | Cl-CH$_2$CH$_2$CH$_2$-N(CH$_3$)-O$_2$S-C$_6$H$_3$(CF$_3$)-NH$_2$ | 2-methyl-indole-sulphonic acid |
| 117 | " | 2-phenyl-indole-sulphonic acid |
| 118 | " | 1-methyl-2-phenyl-indole-sulphonic acid |
| 119 | HO$_3$S-C$_6$H$_3$(CF$_3$)-NH$_2$ | 2-phenyl-indole |
| 120 | " | 1-methyl-2-phenyl-indole |
| 121 | " | 1,2-dimethyl-indole |
| 122 | " | 1-β-cyanoethyl-2-methyl-indole |
| 123 | " | 1-β-cyanoethyl-2-phenyl-indole |
| 124 | HO$_3$S-C$_6$H$_3$(CF$_3$)-NH$_2$ | β-[2-phenyl-indolyl-(1)]-propionic acid amide |
| 125 | " | 2-β-naphthyl-indole |
| 126 | " | 2-p-diphenylyl-indole |
| 127 | " | 1,2,5-trimethylindole |
| 128 | " | 1-ethyl-2-methylindole |
| 129 | " | 2-methyl-6-chloro-indole |
| 130 | " | 2-methyl-7-chloro-indole |
| 131 | " | 2-methyl-5,7-dichloro-indole |

—Continued

| Example | Diazo component | Coupling component |
|---|---|---|
| 132 | " | 1-β-cyanoethyl-2,6-dimethyl-indole |
| 133 | " | 2-methyl-5-methoxy-indole |
| 134 | " | 2-methyl-5-bromo-indole |
| 135 | " | 2-methyl-5-fluoro-indole |
| 136 | 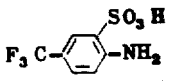 | 2-methyl-indole |
| 137 | " | 2-phenyl-indole |
| 138 | " | 1-methyl-2-phenyl-indole |
| 139 | " | 1,2-dimethyl-indole |
| 140 | " | 1-β-cyanoethyl-2-methyl-indole |
| 141 | " | 1-β-cyanoethyl-2-phenyl-indole |
| 142 | " | β-[2-phenyl-indolyl-(1)]-propionic acid amide |
| 143 | " | 2-β-naphthyl-indole |
| 144 | " | 2-p-diphenylyl-indole |
| 145 | " | 1,2,5-trimethyl-indole |
| 146 | " | 1-ethyl-2-methyl-indole |
| 147 | " | 2-methyl-6-chloro-indole |
| 148 | 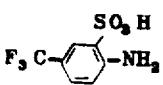 | 2-methyl-7-chloro-indole |
| 149 | " | 2-methyl-5,7-dichloro-indole |
| 150 | " | 1-β-cyanoethyl-2,6-dimethyl-indole |
| 151 | " | 2-methyl-5-methoxy-indole |
| 152 | " | 2-methyl-5-bromo-indole |
| 153 | " | 2-methyl-5-fluoro-indole |
| 154 | 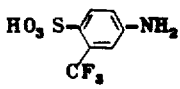 | 2-methyl-indole |
| 155 | " | 2-phenyl-indole |
| 156 | " | 1-methyl-2-phenyl-indole |
| 157 | " | 1,2-dimethyl-indole |
| 158 | " | 1-β-cyanoethyl-2-methyl-indole |
| 159 | " | 1-β-cyanoethyl-2-phenyl-indole |
| 160 | " | β-[2-phenyl-indolyl-(1)]-propionic acid amide |

-Continued

| Example | Diazo component | Coupling component |
|---|---|---|
| 161 | " | 2-β-naphthyl-indole |
| 162 | " | 2-p-diphenylyl-indole |
| 163 | " | 1,2,5-trimethyl-indole |
| 164 | " | 1-ethyl-2-methyl-indole |
| 165 | " | 1-n-butyl-2-methyl-indole |
| 166 | " | 2-methyl-6-chloro-indole |
| 167 | " | 2-methyl-7-chloro-indole |
| 168 | " | 2-methyl-5,7-dichloro-indole |
| 169 | " | 1-β-cyanoethyl-2,6-dimethyl-indole |
| 170 | " | 2-methyl-5-methoxy-indole |
| 171 | " | 2-methyl-5-bromo-indole |
| 172 | 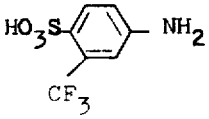 | 2-methyl-5-fluoro-indole |
| 173 | 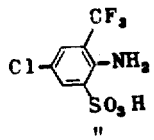 | 2-methyl-indole |
| 174 | " | 2-phenyl-indole |
| 175 | " | 1-methyl-2-phenyl-indole |
| 176 | " | 1-β-cyanoethyl-2-methyl-indole |
| 177 | " | 1-ethyl-2-phenyl-indole |
| 178 | " | 1,2,5-trimethyl-indole |
| 179 | " | 2-methyl-6-chloro-indole |
| 180 | " | 1-β-cyanoethyl-2,6-dimethyl-indole |
| 181 | 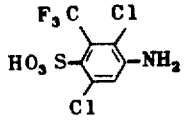 | 2-methyl-indole |
| 182 | " | 2-phenyl-indole |
| 183 | " | 1-methyl-2-phenyl-indole |
| 184 | " | 1-β-cyanoethyl-2-methyl-indole |
| 185 | " | 1-β-cyanoethyl-2-phenyl-indole |
| 186 | " | 2-methyl-5-methoxy-indole |
| 187 | " | 2-methyl-6-chloro-indole |
| 188 | 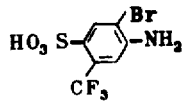 | 2-methyl-indole |
| 189 | " | 2-phenyl-indole |
| 190 | " | 1-methyl-2-phenyl-indole |

— Continued

| Example | Diazo component | Coupling component |
|---|---|---|
| 191 | " | 1-β-cyanoethyl-2-methyl-indole |
| 192 | " | 1-β-cyanoethyl-2-phenyl-indole |
| 193 | " | 2-methyl-5-methoxy-indole |
| 194 | HO₃S—C₆H₂(Br)(CF₃)—NH₂ | 2-methyl-6-chloro-indole |
| 195 | HO₃S—C₆H₂(OCH₃)(CF₃)—NH₂ | 2-methyl-indole |
| 196 | " | 2-phenyl-indole |
| 197 | " | 1-methyl-2-phenyl-indole |
| 198 | " | 1-β-cyanoethyl-2-methyl-indole |
| 199 | " | 1-β-cyanoethyl-2-phenyl-indole |
| 200 | " | 2-methyl-5-methoxy-indole |
| 201 | " | 2-methyl-6-chloro-indole |
| 202 | " | 1,2-dimethyl-indole |
| 203 | " | 1,2,5-trimethyl-indole |
| 204 | HO₃S—C₆H₂(CF₃)(CH₃)—NH₂ | 2-methyl-indole |
| 205 | " | 2-phenyl-indole |
| 206 | " | 1-methyl-2-phenyl-indole |
| 207 | " | 1,2-dimethyl-indole |
| 208 | " | 1,2,5-trimethyl-indole |
| 209 | " | 1-β-cyanoethyl-2-methyl-indole |
| 210 | " | 1-β-cyanoethyl-2-phenyl-indole |
| 211 | " | β-[2-phenyl-indolyl-(1)]-propionic acid amide |
| 212 | HO₃S—C₆H₃(CF₃)—NH₂ | 2-methyl-indole-sulphonic acid |
| 213 | " | 2-phenyl-indole-sulphonic acid |
| 214 | " | 1-methyl-2-phenyl-indole-sulphonic acid |
| 215 | HO₃S—C₆H₃(CF₃)—NH₂ | 1,5-dimethyl-2-phenyl-indole-sulphonic acid |
| 216 | F₃C—C₆H₃(SO₃H)—NH₂ | 2-methyl-indole-sulphonic acid |

-Continued

| Example | Diazo component | Coupling component |
|---|---|---|
| 217 | " | 2-phenyl-indole-sulphonic acid |
| 218 | " | 1-methyl-2-phenyl-indole-sulphonic acid |
| 219 | " | 1,2,5-trimethyl-indole-sulphonic acid |
| 220 | " | 1,5-dimethyl-2-phenyl-indole-sulphonic acid |
| 221 | 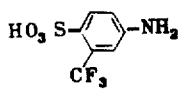 | 2-methyl-indole-sulphonic acid |
| 222 | " | 2-phenyl-indole-sulphonic acid |
| 223 | " | 1-methyl-2-phenyl-indole-sulphonic acid |
| 224 | " | 1,2-dimethyl-5-chloro-indole-sulphonic acid |
| 225 | " | 1,2,5-trimethyl-indole-sulphonic acid |
| 226 | 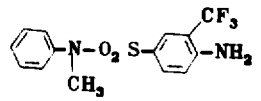 | 1-ethyl-2-methyl-indole-sulphonic acid |
| 227 | " | 2-methyl-indole-sulphonic acid |
| 228 | " | 1-methyl-2-phenyl-indole-sulphonic acid |
| 229 | " | 2-phenyl-indole-sulphonic acid |
| 230 | 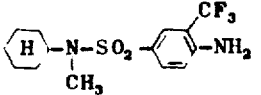 | 2-methyl-indole-sulphonic acid |
| 231 | 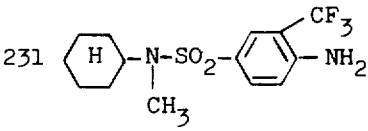 | 1-methyl-2-phenyl-indole-sulphonic acid |
| 232 | 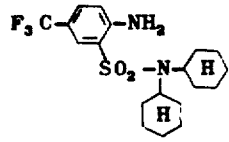 | 2-methyl-indole-sulphonic acid |
| 233 | " | 2-phenyl-indole-sulphonic acid |
| 234 | 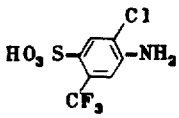 | 2-methyl-indole |
| 235 | " | 2-phenyl-indole |
| 236 | " | 1-methyl-2-phenyl-indole |

— Continued

| Example | Diazo component | Coupling component |
|---|---|---|
| 237 | " | 2,5-dimethyl-indole |
| 238 | 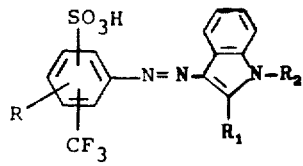 | 2-methyl-indole-sulphonic acid |
| 239 | " | 2-phenyl-indole-sulphonic acid |
| 240 | " | 1-methyl-2-phenyl-indole-sulphonic acid |

We claim:
1. Dyestuff of the formula

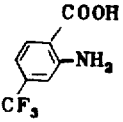

wherein
R is hydrogen, methyl, methoxy, chloro or bromo;
$R_1$ is $C_1$—$C_4$—alkyl or phenyl;
$R_2$ is hydrogen, $C_1$—$C_4$—alkyl or $C_1$—$C_4$—alkyl substituted by cyano, carbonamido, or carboxy.

* * * * *